(12) United States Patent
Gerner et al.

(10) Patent No.: US 7,713,331 B2
(45) Date of Patent: *May 11, 2010

(54) AXIAL TRANSFER LINE DEGASSING

(75) Inventors: Yuri Gerner, Mendota Heights, MN (US); Carl W. Sims, St. Paul, MN (US); Thomas J. Thielen, Plymouth, MN (US)

(73) Assignee: Rheodyne, LLC, Roseville, MN (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/566,320

(22) Filed: Dec. 4, 2006

(65) Prior Publication Data

US 2007/0095204 A1 May 3, 2007

Related U.S. Application Data

(63) Continuation-in-part of application No. 10/981,934, filed on Nov. 5, 2004, now Pat. No. 7,144,443, which is a continuation-in-part of application No. 10/702,013, filed on Nov. 5, 2003, now Pat. No. 6,949,132.

(51) Int. Cl.
*B01D 19/00* (2006.01)
*B01D 53/22* (2006.01)
(52) U.S. Cl. .................. 95/46; 95/241; 96/6; 96/7; 96/8; 96/10; 96/155; 73/61.55
(58) Field of Classification Search .............. 95/46, 95/241; 96/6, 7, 8, 10, 155; 73/61.55
See application file for complete search history.

(56) References Cited

U.S. PATENT DOCUMENTS

| 3,668,837 A | 6/1972 | Gross |
| 3,751,879 A | 8/1973 | Allington |

(Continued)

FOREIGN PATENT DOCUMENTS

CA 2 268 641 1/2001

(Continued)

OTHER PUBLICATIONS

"Gas and Vapor Transport Properties of Amorphous Perfluorinated Copolymer Membranes Based on 2,2-bistrifluoromethyl-4,5-difluoro-1,3-dioxole/tetrafluoroethylene", Pinnau et al., Journal of Membrane Science 109 (1996) pp. 125-133.

(Continued)

*Primary Examiner*—Duane Smith
*Assistant Examiner*—Douglas J Theisen
(74) *Attorney, Agent, or Firm*—Haugen Law Firm PLLP

(57) ABSTRACT

An elongated flow-through degassing apparatus includes an elongated gas and liquid impermeable outer member and a gas-permeable, liquid-impermeable inner barrier extending within the outer member and at least partially along a first chamber defined within the outer member. The apparatus also includes inlet and outlet connection structures operably coupled to respective portions of the outer member and a second chamber defined by the inner barrier to further enable a sealed engagement between the outer member and the inner barrier, and to provide for connection devices to operably couple the degassing apparatus of the present invention to respective spaced apart components. The degassing apparatus may be sufficiently flexible so as to be readily manipulatable into desired configurations.

12 Claims, 6 Drawing Sheets

U.S. PATENT DOCUMENTS

| | | | |
|---|---|---|---|
| 4,133,767 A | | 1/1979 | Bakalyar et al. |
| 4,230,463 A | | 10/1980 | Henis et al. |
| 4,268,279 A | | 5/1981 | Shindo et al. |
| 4,325,715 A | | 4/1982 | Bowman et al. |
| 4,430,098 A | | 2/1984 | Bowman et al. |
| 4,469,495 A | | 9/1984 | Hiraizumi et al. |
| 4,754,009 A | | 6/1988 | Squire |
| 4,781,837 A | | 11/1988 | Lefebvre |
| 4,834,877 A | | 5/1989 | Peters et al. |
| 4,840,819 A | | 6/1989 | Williams et al. |
| 4,844,871 A | | 7/1989 | Polaschegg |
| 4,923,679 A | * | 5/1990 | Fukasawa et al. ............. 422/48 |
| 4,938,778 A | | 7/1990 | Ohyabu et al. |
| 4,948,851 A | | 8/1990 | Squire |
| 4,994,180 A | | 2/1991 | Sims et al. |
| 5,051,113 A | | 9/1991 | Nemser |
| 5,051,114 A | | 9/1991 | Nemser et al. |
| 5,098,566 A | | 3/1992 | Lefebvre |
| 5,100,555 A | * | 3/1992 | Matson ........................ 95/44 |
| 5,116,650 A | | 5/1992 | Bowser |
| 5,147,417 A | | 9/1992 | Nemser |
| 5,183,486 A | | 2/1993 | Gatten et al. |
| 5,205,844 A | | 4/1993 | Morikawa |
| 5,238,471 A | | 8/1993 | Blanchet-Fincher |
| 5,254,143 A | | 10/1993 | Anazawa et al. |
| 5,258,202 A | | 11/1993 | Pellegrino et al. |
| 5,281,255 A | | 1/1994 | Toy et al. |
| 5,290,340 A | | 3/1994 | Gatten et al. |
| 5,340,384 A | | 8/1994 | Sims |
| 5,382,365 A | | 1/1995 | Deblay |
| 5,383,483 A | | 1/1995 | Shibano |
| 5,425,803 A | | 6/1995 | van Schravendijk et al. |
| 5,522,917 A | | 6/1996 | Honda et al. |
| 5,523,118 A | | 6/1996 | Williams |
| 5,526,641 A | | 6/1996 | Sekar et al. |
| 5,554,414 A | | 9/1996 | Moya et al. |
| 5,584,914 A | | 12/1996 | Senoo et al. |
| 5,636,619 A | | 6/1997 | Poola et al. |
| 5,649,517 A | | 7/1997 | Poola et al. |
| 5,678,526 A | | 10/1997 | Cullen et al. |
| 5,749,942 A | | 5/1998 | Mattis et al. |
| 5,762,684 A | | 6/1998 | Hayashi et al. |
| 5,788,742 A | * | 8/1998 | Sugimoto et al. ............... 95/46 |
| 5,824,223 A | | 10/1998 | Michaels et al. |
| 5,876,604 A | * | 3/1999 | Nemser et al. .............. 210/634 |
| 5,902,747 A | | 5/1999 | Nemser et al. |
| 5,914,154 A | | 6/1999 | Nemser |
| 5,938,928 A | | 8/1999 | Michaels |
| 5,989,318 A | * | 11/1999 | Schroll ........................... 96/6 |
| 6,221,247 B1 | | 4/2001 | Nemser et al. |
| 6,248,157 B1 | | 6/2001 | Sims et al. |
| 6,299,777 B1 | | 10/2001 | Bowser |
| 6,315,815 B1 | | 11/2001 | Spadaccini et al. |
| 6,469,116 B2 | | 10/2002 | Maccone et al. |
| 6,478,852 B1 | | 11/2002 | Callaghan et al. |
| 6,494,938 B2 | * | 12/2002 | Sims et al. ....................... 96/6 |
| 6,540,813 B2 | | 4/2003 | Nelson et al. |
| 6,569,341 B2 | | 5/2003 | Bowser |
| 6,582,496 B1 | | 6/2003 | Cheng et al. |
| 6,726,840 B1 | | 4/2004 | Arcella et al. |
| 6,770,202 B1 | | 8/2004 | Kidd et al. |
| 6,949,132 B2 | * | 9/2005 | Thielen et al. .................... 96/6 |
| 6,955,758 B2 | * | 10/2005 | Yamazaki et al. ........... 210/150 |
| 7,144,443 B2 | * | 12/2006 | Gerner et al. .................. 95/46 |
| 2001/0025819 A1 | | 10/2001 | Bowser |
| 2003/0116491 A1 | * | 6/2003 | Yamazaki et al. ........... 210/188 |
| 2003/0192428 A1 | | 10/2003 | Cheng et al. |
| 2004/0238343 A1 | | 12/2004 | Kuo et al. |

FOREIGN PATENT DOCUMENTS

| | | |
|---|---|---|
| EP | 0 649 676 A1 | 4/1995 |
| EP | 0 641 591 B1 | 1/2000 |
| JP | 40 3221 130 A | 9/1991 |
| JP | 40 3224 602 A | 10/1991 |
| JP | 40 5068 808 A | 3/1993 |
| SU | 00 0871 806 A | 10/1931 |
| WO | WO 90/15662 | 12/1990 |

OTHER PUBLICATIONS

"The Role of Dissolved Gases in High-Performance Liquid Chromatography", Bakalyar et al., Journal of Chromatography, 158 (1978) pp. 277-293.

"Properties of Amorphous Fluoropolymers Based on 2,2-bistrifluoromethyl-4,5-difluoro-1,3-dioxole", Buck et al., 183rd Meeting of the Electrochemical Society, Honolulu, HI, May 17, 1993.

Applications of Membranes in Industry: Glassy Fluoropolymer Membranes, Nemser, Compact Membrane Systems, Inc., 21st Aharon Katzir-Katchalsky Conference, Sep. 1993, Rehovot, Israel.

* cited by examiner

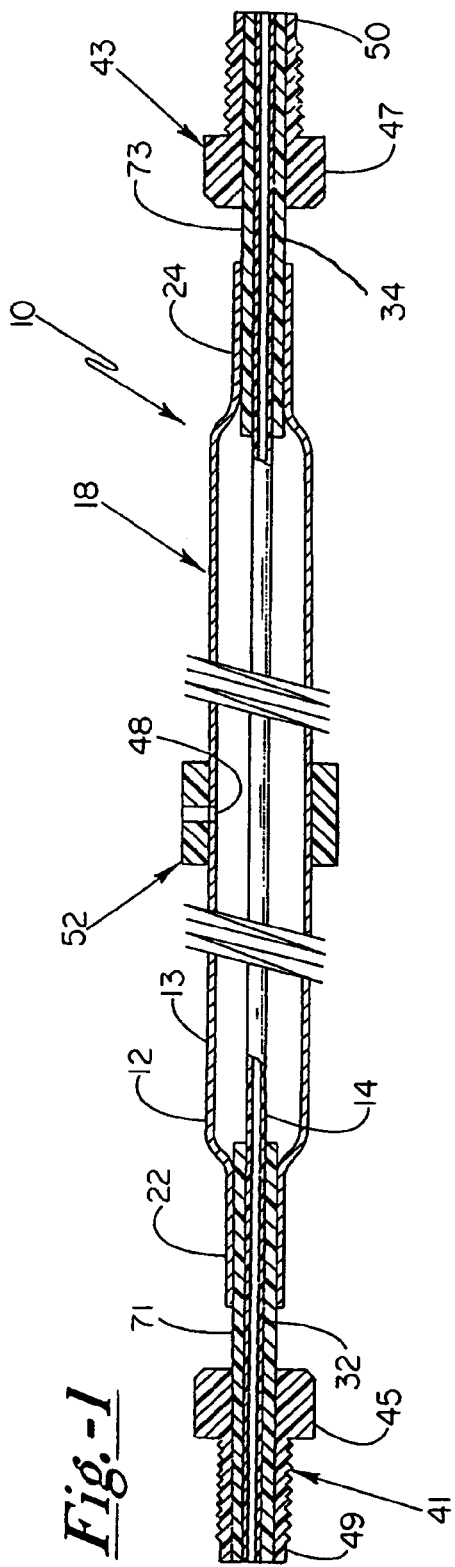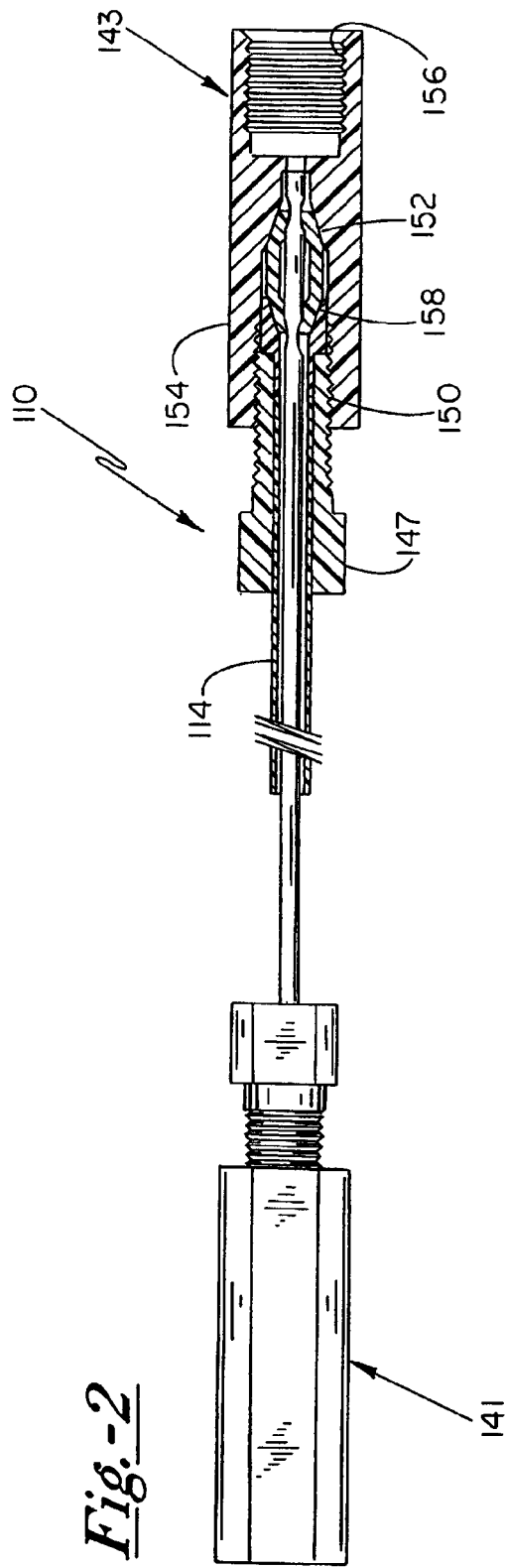

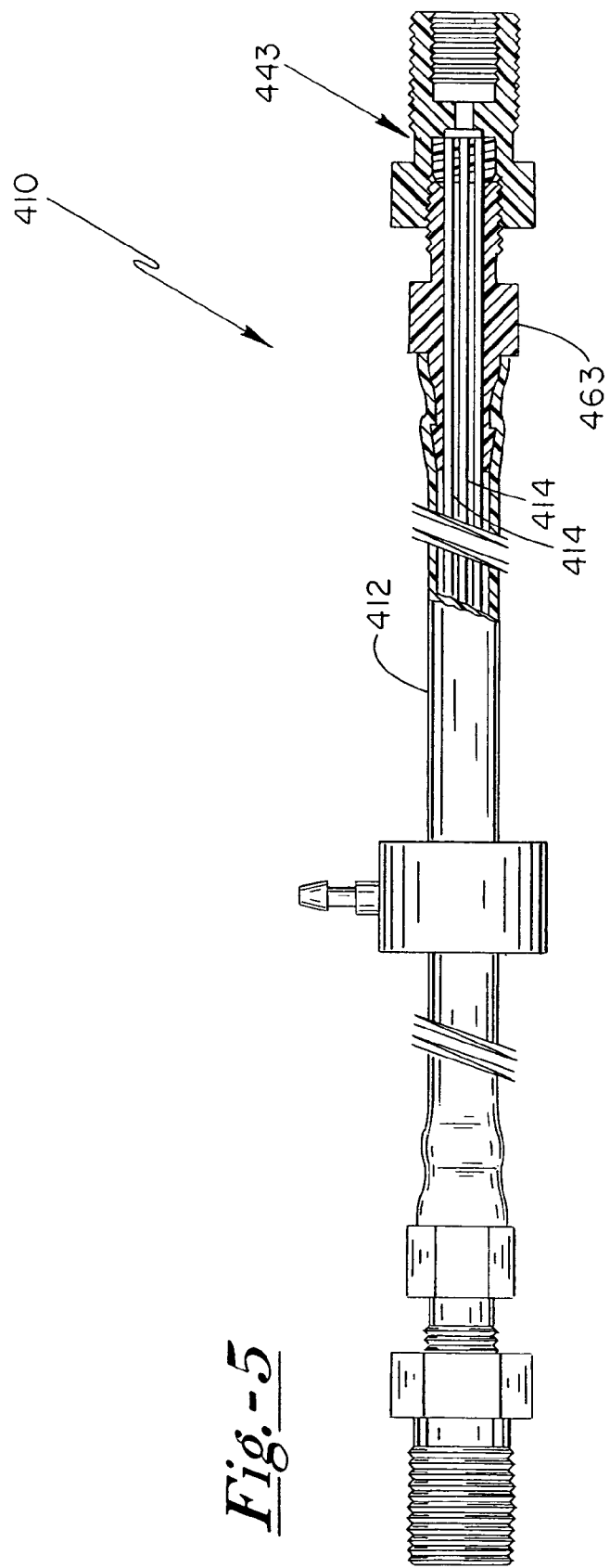

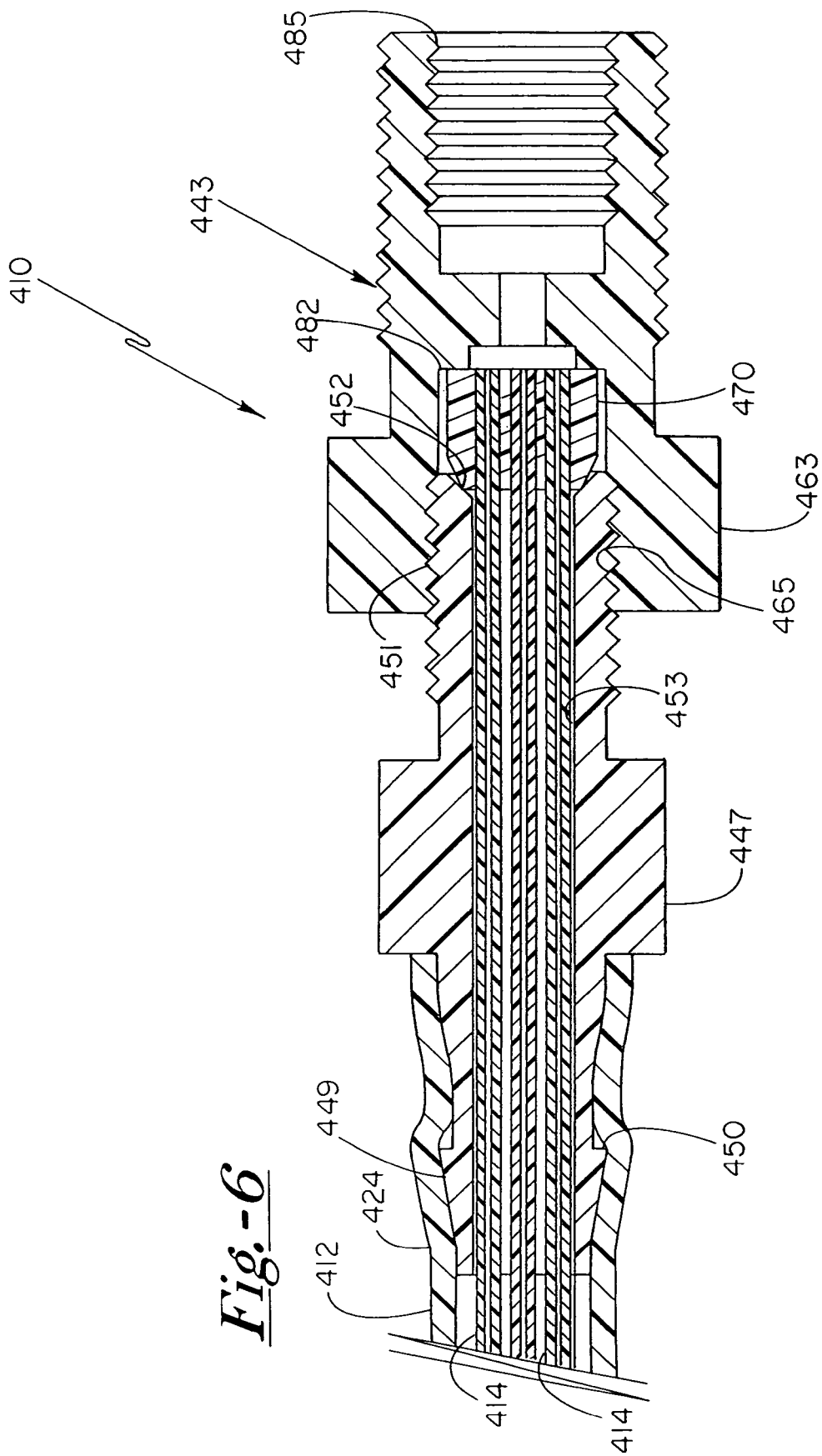

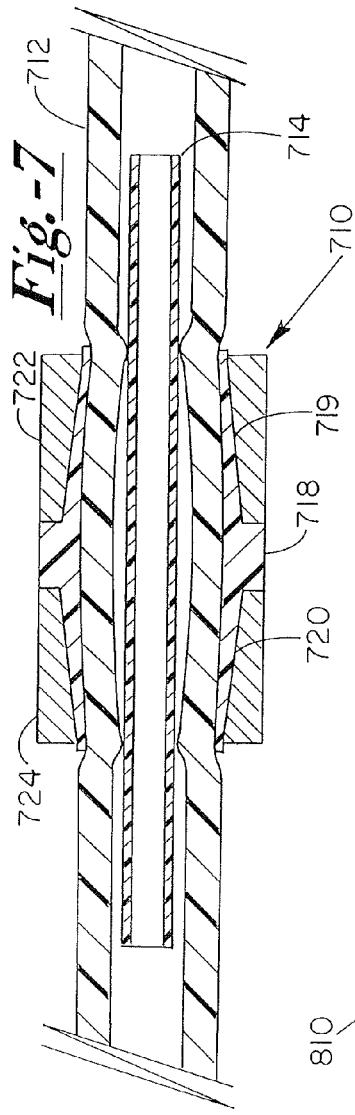
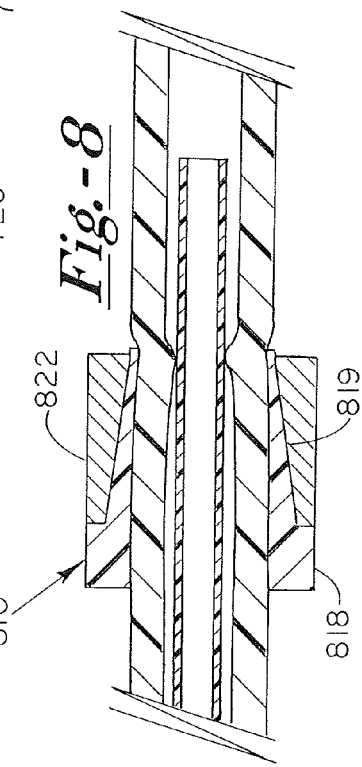
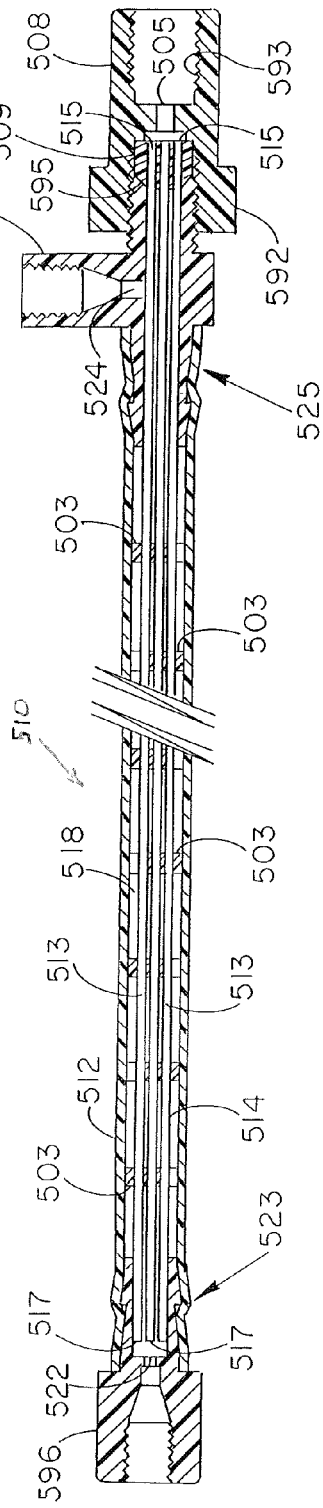

AXIAL TRANSFER LINE DEGASSING

CROSS-REFERENCE TO RELATED APPLICATIONS

This application is a continuation-in-part of U.S. patent application Ser. No. 10/981,934, now U.S. Pat. No. 7,144,443, filed on Nov. 5, 2004 and entitled "Axial Transfer Line Degassing", which itself is a continuation-in-part of U.S. patent application Ser. No. 10/702,013, now U.S. Pat. No. 6,949,132, filed on Nov. 5, 2003 and entitled "Axial Degassing Transfer Lines", the contents of which are incorporated herein in their entirety.

FIELD OF THE INVENTION

The present invention relates generally to systems for degassing fluids utilized in a wide variety of applications, including the degassing of chromatographic fluids, inks, semiconductor processing fluids, beverages, and laboratory-grade fluids, and more particularly to a flow-through transfer line degassing apparatus wherein transfer lines extending between respective components in systems incorporating such an apparatus simultaneously act to operably degas fluids passing therethrough.

BACKGROUND OF THE INVENTION

There are many chemical applications, particularly analytical applications involving the use of liquid solvents, reactants or the like in which the presence of dissolved gases, and particularly air, is undesirable. A prime example of such an application relates to the fluids utilized in liquid chromatography where the presence of even small amounts of dissolved gases interferes with the accuracy and sensitivity of the results obtained. For example, air dissolved in the mobile phase can manifest itself in the form of bubbles which causes noise and drift as the mobile phase passes through the chromatographic detector. In situations where the dissolved gases are chemically active, unwanted modifications or deterioration in the chromatographic fluids can occur. Therefore, it is desirable to remove such species through a degassing process.

The degassing of liquid materials has been necessary to the success of many processes, and, consequently, various degassing methods have been employed for some time. Techniques have included heating or boiling the fluid to be degassed, exposing the material to a reduced pressure environment or vacuum, and using combination of heat and vacuum to reduce the amount of dissolved gases in the fluid. Ultrasonic energy has also been employed for such degassing purposes. As conventionally applied, however, these traditional techniques have generally fallen short of the desired degree of separation efficiency.

Vacuum degassing through a membrane apparatus has long been known, and generally utilizes a length of relatively small diameter, thin-walled, semi-permeable synthetic polymer barrier contained within an enclosed chamber held under a reduced pressure or vacuum in which the fluid to be degassed is caused to flow through the tube. One such apparatus is shown by Sims in U.S. Pat. No. 5,340,384, assigned to the same Assignee as in the present invention. Other such devices are shown in U.S. Pat. Nos. 5,183,486; 4,430,098; and 3,668,837.

While each of these devices employ a vacuum degassing approach, there remains a need, particularly with devices associated with liquid chromatography instruments, to provide a fluid degassing capability in fluid transfer lines operably coupling respective components of such chromatographic instruments. In conventional degassing systems, chromatographic fluids are routed into a distinct vacuum chamber for performing the degassing function thereat. In such a manner, a separate and distinct component must be incorporated into the chromatographic instrument assembly. Moreover, fluid transfer lines must be routed from respective fluid reservoirs to a distinct vacuum chamber prior to such fluid flow through the chromatographic instruments.

It is therefore a principle object of the present invention to provide fluid transfer lines as axially-disposed individual degassing chambers.

It is another object of the present invention to provide chromatographic fluid transfer lines which are operably coupled to vacuum sources so as to enable vacuum-type degassing upon the fluids passing therethrough.

It is a yet further object of the present invention to provide an elongated flow-through vacuum degassing apparatus having an outer impermeable member and one or more gas-permeable, liquid-impermeable inner barriers disposed therewithin, with fluids passing either through or around the chambers defined by the one or more inner barriers in a relatively low-pressure environment between the outer member and the inner barriers so as to effect a vacuum degassing characteristic upon the inner barriers.

It is a still further object of the present invention to provide an elongated flow-through transfer line vacuum degassing apparatus having an outer member and one or more inner barriers disposed therewithin, and wherein the inner barriers are formed solely from one or more fluorinated polymeric materials.

It is another object of the present invention to provide an elongated transfer line vacuum degassing apparatus that is sufficiently flexible so as to be readily manipulatable into desired configurations.

It is a further object of the present invention to provide a transfer line fluid degassing apparatus having an outer impermeable member and one or more primarily non-porous, gas-permeable, liquid-impermeable inner barriers disposed therewithin, and wherein the one or more inner barriers are formed solely from one or more fluorinated polymeric materials.

It is another object of the present invention to provide a transfer line apparatus having an outer impermeable member and one or more primarily non-porous, gas-permeable, liquid-impermeable inner barriers disposed therewithin, with the transfer line apparatus preventing regassing of fluids passing therethrough.

SUMMARY OF THE INVENTION

By means of the present invention, fluids may be operably degassed in distinct transfer lines extending between respective components in an associated fluid flow system. The transfer lines of the present invention are preferably configured as axially-disposed individual degassing units having an elongated liquid and gas-impermeable outer member, and one or more one or more substantially non-porous, gas-permeable, liquid-impermeable inner barriers disposed therewithin. The outer member and inner barriers, in combination, may be sufficiently flexible so as to be readily manipulatable into desired configurations.

In a particular embodiment of the present invention, the elongated flow-through fluid treatment apparatus includes an elongated outer member that is gas and liquid impermeable, and has an inlet end, an outlet end, and a vacuum source coupling aperture formed in a side wall thereof. The degassing apparatus further includes an inner barrier extending within the outer member, with the inner barrier being gas-permeable and liquid-impermeable, and which has an inlet portion and an outlet portion corresponding to the inlet and outlet ends of the outer member. In addition, a vacuum source adaptor extends from the side wall of the outer member and co-extensively with the vacuum source coupling aperture such that a hollow channel extending through the vacuum source adaptor provides for fluid connection from a space defined between the outer member and the inner barrier to locations external to the vacuum source adaptor. The apparatus of the present invention further includes an inlet connection apparatus operably coupled to the inlet end of the outer member and the inlet portion of a chamber defined by the inner barrier, and an outlet connection apparatus operably coupled to the outlet end of the outer member and the outlet portion of the chamber defined by the inner barrier. The apparatus is preferably sufficiently flexible so as to be readily manipulatable into desired configurations.

Another embodiment of the invention provides for a method for treating a fluid involving a transfer line apparatus having an outer member defining a first chamber having a length, an inlet, and an outlet, with the outer member being substantially gas and liquid impermeable. The apparatus further includes a primarily non-porous inner barrier extending within the outer member and at least partially along the first chamber, with the inner barrier being substantially gas-permeable and liquid-impermeable. The inner barrier defines a second chamber by being interposed between the second chamber and the first chamber. The second chamber has an open end and a substantially opposed closed end. The method further provides for operably coupling the open end of the second chamber into communication with a vacuum source so as to substantially evacuate the second chamber. The fluid is transported through the first chamber from the inlet through the outlet so as to effect a vacuum degassing or regassing prevention operation on the fluid.

In a still further aspect of the present invention, a method of treating a fluid includes providing a transfer line apparatus having an outer member defining a first chamber which has a length, an inlet, and an outlet, with the outer member being substantially gas and liquid-impermeable. The apparatus further includes a primarily non-porous inner barrier extending within the outer member and at least partially through the first chamber, with the inner barrier being substantially gas-permeable and liquid-impermeable. The inner barrier defines a second chamber by being interposed between the second chamber and the first chamber. The method further includes operably coupling an open end of the second chamber to a first fluid source, such that the first fluid is transported through the second chamber. Additionally, a second fluid is operably transported through the first chamber from the inlet through the outlet. Where the second fluid has a lower target gas concentration than the first fluid, the target gas is accordingly caused to operably pass through the inner barrier from the first fluid to the second fluid. By contrast, where the second fluid has a higher target gas concentration than the first fluid, the target gas is correspondingly caused to operably pass through the inner barrier from the second fluid to the first fluid.

BRIEF DESCRIPTION OF THE DRAWINGS

FIG. 1 is a cross-sectional view of a transfer line degassing apparatus of the present invention;

FIG. 2 is a partial cut-away view of a degassing apparatus of the present invention incorporating a particular configuration for the inlet and outlet connection means;

FIG. 5 is a cross-sectional view of a transfer line degassing apparatus of the present invention;

FIG. 6 is an enlarged view of a portion of the degassing apparatus illustrated in FIG. 5;

FIG. 7 is a cross-sectional view of a sealing mechanism of the present invention;

FIG. 8 is a cross-sectional view of a sealing mechanism of the present invention;

FIG. 9 is a cross-sectional view of a transfer line degassing apparatus of the present invention.

DETAILED DESCRIPTION OF THE PREFERRED EMBODIMENTS

Figure 3:
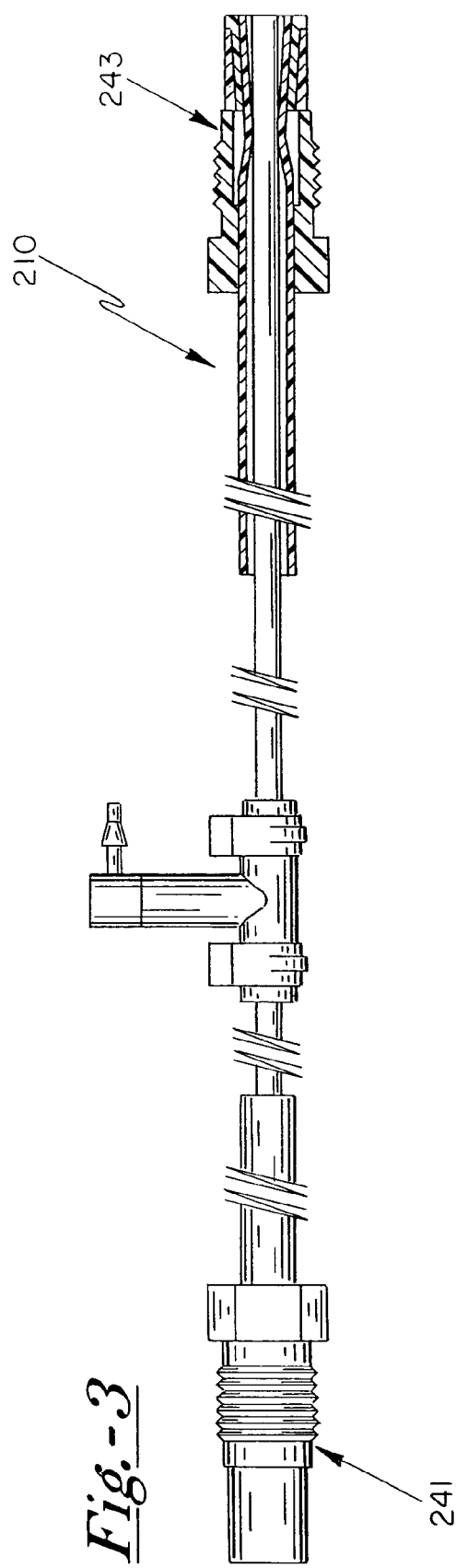
FIG. 3 is a partial cut-away view of a degassing apparatus of the present invention incorporating a particular configuration for the inlet and outlet connection means.

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

With reference now to the drawings, and first to FIG. 1, a transfer line degassing apparatus 10 of the present invention includes an outer tube 12 and an inner tube 14 disposed within outer tube 12. Outer tube 12 preferably forms an elongated sealed chamber through which inner tube 14 extends.

As illustrated in FIG. 1, outer tube 12 includes an inlet end 22 and an outlet end 24, with inner tube 14 having a corresponding inlet portion 32 and outlet portion 34. Inlet and outlet connection devices 41, 43 are preferably operably coupled to respective inlet and outlet ends 22, 24 of outer tube 12, and to inlet portions 32, 34 of inner tube 14. Inlet and outlet connection devices 41, 43 are preferably configured so as to operably provide a gas-tight coupling at respective inlet and outlet ends 22, 24 of outer tube 12, as between outer tube 12, respective connection devices 41, 43 and inner tube 14 thereat. As such, the portion of outer tube 12 between inlet end 22 and outlet end 24 forms a sealed chamber 18 through which inner tube 14 passes.

A vacuum source coupling aperture 48 is preferably formed in the sidewall of outer tube 12 and extends therethrough, such that the space between outer tube 12 and inner tube 14 is fluidly connected to an environment external to apparatus 10 via aperture 48. In preferred embodiments of the present invention, a vacuum source adapter 52 extends from the sidewall 13 of outer tube 12 and coextensively with aperture 48. Vacuum source adaptor 52 is preferably configured so as to be operably coupled to a vacuum source, whereby open space with chamber 18 may be substantially evacuated during use. In such a manner, fluids flowing through inner tube 14 at locations within the chamber 18 are caused to be degassed, as governed by Henry's Law of partial pressure. As such, gas entrained within fluids passing through inner tube 14 will have the tendency to be drawn through the gas-permeable, liquid-impermeable inner tube 14, and into the relatively low pressure environment within chamber 18. Gas that is so drawn from the fluid within inner tube 14 is consequently removed from chamber 18 via aperture 48, which is operably coupled to a vacuum source.

It is also contemplated by the present invention that the apparatus described herein for degassing one or more fluids may also be utilized in preventing the regassing of such fluids. For example, a fluid that has previously been substantially degassed may be directed through apparatus 10 such that, for the length of apparatus 10, the fluid passing therethrough does not absorb gaseous components. Such an aspect is important where pre-degassed fluids must be transferred from a source to a destination without absorbing gaseous components therein. The apparatus of the present invention, therefore, enables such transportation of pre-degassed fluids without risk of regassing due to the fact that the vacuum prevents gaseous components from entering into the fluid stream. In such a manner, the apparatus of the present invention may be termed a fluid treatment apparatus which may be utilized to degas fluids and/or prevent the regassing of such fluids in a transfer line device.

In another embodiment of the present invention, and as illustrated in FIG. 9, the fluids to be degassed may instead be directed through chamber 518, as defined between inner tubes 514 and outer tube 512, while a low pressure environment is obtained within inner tubes 514. In such a manner, the degassing function operates in the reverse direction, with target gas entrained within the fluid being drawn by partial pressure through the respective walls of inner tubes 514, and into the relatively low pressure environment within the respective chambers defined by inner tubes 514.

As shown in FIG. 9, outer tube 512 preferably has an inlet end 523 and a substantially opposed outlet end 525. Similarly to apparatus 10 described with reference to FIG. 1, outer tube 512 is preferably substantially gas and liquid impermeable, and most preferably is less gas-permeable than the combined gas permeabilities of inner tubes 514. Example materials useful in outer tube 512 include Tefzel® (a modified ETFE), PEEK, FEP, PFE, Tygon® (a polymeric material available from Saint Gobain Performance Plastics of Akron, Ohio), and the like. In addition to having a relatively low permeability characteristic, outer tube 512, as well as all other outer tubes described in this application, preferably exhibit inertness and physical flexibility, such that the transfer line apparatus of the present invention is relatively flexible so as to allow ready manipulation of the transfer line apparatus with relatively little effort. As such, some embodiments of the transfer line apparatus of the invention may be manipulated by the user into a wide variety of configurations to best conform to the desired application.

Inner tubes 514 of transfer line apparatus 510 extend within outer tube 512 and at least partially through chamber 518. In the embodiment illustrated in FIG. 9, inner tubes 514 each have an open end 515 and a substantially opposed closed end 517. Vacuum line coupler 592 is preferably engaged with fluid inlet coupler 594, which itself is engaged with outer tube 512. Vacuum coupler 592 forms a gas-tight plenum 508 adjacent to respective open ends 515 of inner tubes 514. Such a plenum 508 is gas-tight only with respect to chamber 518, in that ferrule 509 sealingly engages with second end 595 of fluid inlet coupler 594 when vacuum coupler 592 is firmly seated upon fluid inlet coupler 594. Vacuum coupler 592 is preferably operably coupled to a vacuum source (not shown) at first end 593, which is in fluid connection with plenum 508 via passage 505 in vacuum coupler 592. Through such an arrangement, plenum 508 is operably coupled into communication with the vacuum source so as to substantially evacuate respective chambers 513 defined within inner tubes 514.

The fluid to be degassed is preferably directed into chamber 518 via inlet coupler 594, which is sealingly engaged with outer tube 512. Fluid entering chamber 518 at inlet 524 through fluid inlet coupler 594 is directed by fluid pressure about inner tubes 514, and eventually out from chamber 518 at outlet 522 through fluid outlet coupler 596. By passing fluid around the semi-permeable inner tubes 514, which are substantially evacuated as described above, entrained gas within the fluid is drawn by Henry's Law of partial pressure through respective inner tubing walls and into the respective chambers 513 defined by inner tubes 514. The vacuum source acts to remove gas from within chambers 513 that permeate through the sidewalls of inner tubes 514.

As further illustrated in apparatus 510, baffles 503 may be disposed in chamber 518 to direct and/or redirect fluid flow through chamber 518 from inlet 524 to outlet 522. Applicants have determined that by placing structure such as baffles 503 in the fluid path through chamber 518, laminar flow of the fluid through chamber 518 may be disrupted. Such a laminar flow disruption assists in mixing entrained gas throughout the fluid flow volume, thereby enhancing the degassing efficiency of apparatus 510.

Certain advantages are incorporated into the degassing system when the fluid to be degassed is directed through chamber 518 between outer tube 512 and inner tubes 514. For instance, the fluid to be degassed is exposed to a relatively larger gas-permeable separation media surface area, in that the outer diameter of inner tubes 514 is greater than the inner diameter thereof. By directing the fluid about the outer surfaces of the inner tubes 514, therefore, a relatively higher degassing efficiency for a particular system is achieved. In addition, the degassing toward the inner tubes 514 may be used to counteract influx of gases through outer tube 512, where outer tube 512 is not completely gas-impermeable.

In other embodiments of the present invention, fluids may be degassed by interaction with a sweep fluid. Such a sweep fluid may be in a gaseous or liquidous form, and preferably flows adjacent to the fluid to be degassed but separated by the gas permeable, liquid impermeable walls of the inner tubes of the present invention. In some embodiments, such sweep fluid flows counter to the flow direction of the liquid being degassed, such that the efficiency of liquid degassing is enhanced. To effectively degas the liquid, the sweep fluid preferably has a relatively low partial pressure (gas) or concentration (liquid) with respect to the target gaseous species being operably removed from the liquid.

Figure 10:
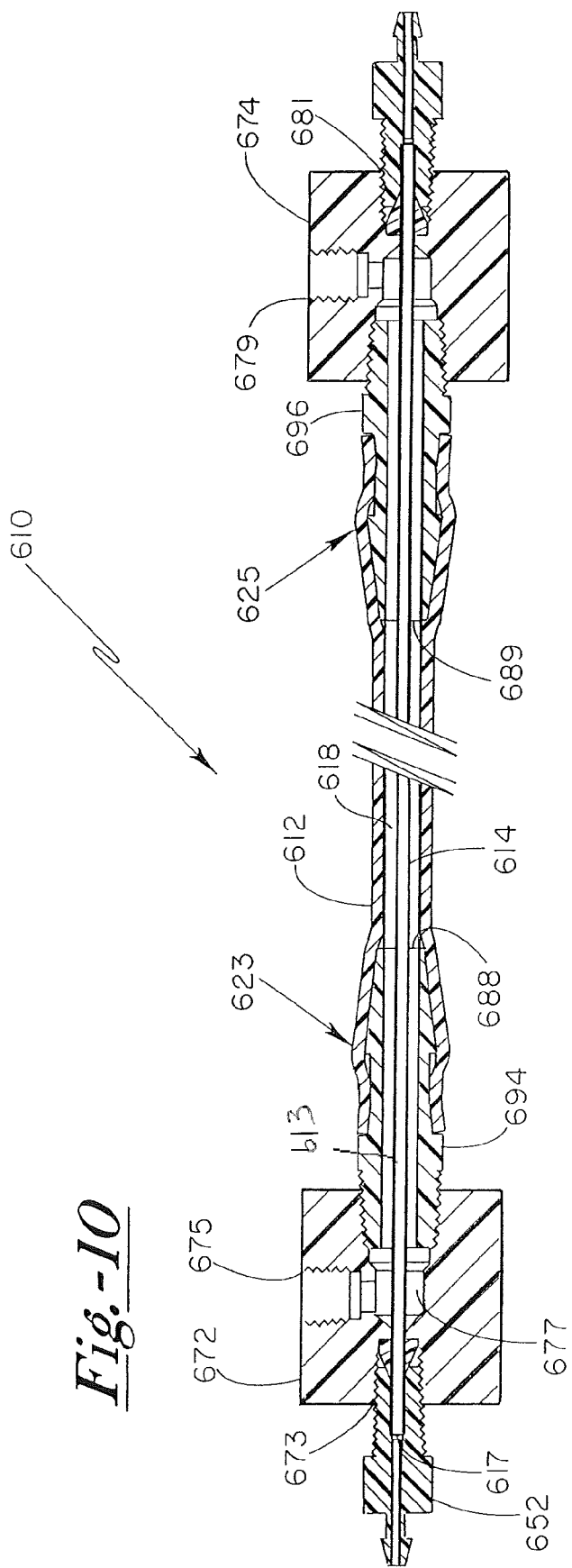
FIG. 10 is a cross-sectional view of a transfer line degassing apparatus of the present invention.

A particular example of an apparatus arranged to degas a fluid through the use of a sweep fluid is illustrated in FIG. 10. As shown therein, apparatus 610 includes an outer substantially impermeable tube 612 and a gas-permeable, substantially liquid-impermeable tube 614 extending therewithin and at least partially through chamber 618 defined within outer tube 612. First and second end portions 623, 625 of outer tube 612 are each preferably sealingly engaged with respective inlet and outlet couplers 694, 696, which each include an open channel 688, 689 axially formed therethrough. As such, chamber 618 is open through inlet and outlet couplers 694, 696.

Inlet and outlet couplers 694, 696 are each engaged with inlet and outlet manifolds 672, 674, respectively. In the embodiment illustrated in FIG. 10, inlet manifold 672 includes a first fluid inlet bore 673 and a second fluid inlet bore 675. Inner tube 614 preferably sealingly engages within fluid inlet adapter 652, such that the first fluid entering fluid inlet adapter 652 is transported without leakage into open end 617 of chamber 613 defined within inner tube 614. Fluid pressure within chamber 613 operably directs the first fluid through inner tube 614 through first fluid outlet bore 681 in outlet manifold 674.

A second fluid is brought into apparatus 610 via second fluid inlet bore 675, which enables fluid connection with chamber 618 within outer tube 612. An open plenum 677 within inlet manifold 672 operably directs the second fluid into open channel 688 in inlet adapter 652, which leads to chamber 618. Fluid pressure in plenum 677 directs the second fluid through chamber 618, and ultimately through second fluid outlet bore 679 in outlet manifold 674.

The target gas concentration that is to be operably decreased in a designated one of the first and second fluids should be higher in the designated removal fluid than in the receiving fluid in order for transfer of the target gas through the one or more semi-permeable tubes to efficiently take place. For example, where target gas is to be removed from the first fluid passing through inner tube 614, the second fluid passing about inner tube 614 in chamber 618 should have a target gas concentration lower than that of the first fluid. When such conditions are present, the second fluid acts as a sweep fluid removing at least a portion of the gas entrained within the first fluid.

The gas transfer between the two fluids can, of course, be opposite of that described above, wherein the first fluid has a target gas concentration less than that of the second fluid. In this case, the target gas will be caused to transfer through respective walls of inner tube 614 from the second fluid passing about inner tube 614 to the first fluid passing through chamber 613 within inner tube 614.

The present invention further contemplates that the flow directions of the first and second fluids can be opposite with respect to one another. In fact, such an arrangement is preferred, wherein the first or second fluid enters apparatus 610 through outlet manifold 674, and the other of the first or second fluid enters apparatus 610 through inlet manifold 672. Such a "counter flow" arrangement has been found to increase the rate of gas transfer between the first and second fluids across the walls of inner tube 614.

In a particularly preferred mode of the invention, one of the first and second fluids is a liquid to be degassed, with the other of the first and second fluids being a gas or liquid having a target gas partial pressure or concentration substantially less than the target gas concentration in the liquid to be degassed. Since gases typically have a higher capacity to receive gaseous materials, a particular embodiment of the invention incorporates a liquid to be degassed with a sweep gas flowing counter to the flow direction of the liquid.

One aspect of the present invention, such as is shown in FIG. 1, is in providing the transfer line degassing apparatus of the present invention with a flexibility characteristic that is sufficient so as to be readily manipulatable into desired configurations. To be effectively used as a transfer line for operably transporting, i.e., chromatographic fluids from one point to another within a respective chromatographic system, the apparatus may be flexible and conformable, whereby inlet connection device 41 may be operably coupled to an upstream component such as a fluid reservoir, and the outlet connection device 43 operably coupled to a downstream component, such as a blending valve apparatus or chromatographic column. Since connections between such components vary by manufacturer as well as by chromatographic system type, the apparatus of the invention may preferably conform to a particular user's configurational needs. Accordingly, for example, outer tube 12 may be fabricated from a variety of materials, such as one or more materials that exhibit a substantial flexibility, relatively low gas and liquid permeability, and is formed in a caliber thickness so as to obtain the above-stated characteristics. Outer tube 12 may therefore be fabricated from one or more of, for example, Tefzel®, FEP, PEEK, PFE, Tygon®, and the like.

In preferred embodiments of the present invention, the one or more inner tubes form the separation membrane barriers, and are substantially gas-permeable and liquid-impermeable, are relatively inert, and optionally are relatively flexible. A variety of materials may be utilized in the gas-permeable, liquid-impermeable barrier performing the separations contemplated by the present invention. In some embodiments, fluorinated polymeric material variants may be utilized alone or in combination with one another, and/or with other materials to form the separation membrane. Example materials that may be useful in the gas-permeable, liquid-impermeable membrane barriers of the present invention include PTFE, silicone rubbers coated on substrates, fluorinated copolymers, amorphous fluorinated copolymers, and the like. A further aspect of the gas-permeable, liquid-impermeable membranes of the present invention is in the fact that such membranes may be formed solely of one or more of the materials or material types described above.

In some embodiments, the gas-permeable, liquid-impermeable membrane barriers may be formed as a primarily non-porous structure. Generally speaking, non-porous structures are substantially free of "through-pores", and act to separate primarily through a sorption-diffusion mechanism. Such separation may be, for example, a gas from a liquid. Such a separation mechanism is contrasted with porous separation media, which typically limit transmission by pore size, and permit transfer by hydrostatic pressure-driven transport, such as convection. Applicants have found that substantially non-porous separation media may be advantageous in certain applications over porous separation media, due to greater selectivity characteristics, and reduced particle fouling susceptibility.

Although substantially non-porous separation membranes may be fabricated from a variety of materials and material combinations, one example class of materials found by the Applicants to be useful in certain arrangements is fluorinated materials, such as fluorinated copolymer materials. One particular material that has been utilized by the Applicant is an amorphous perfluorinated copolymer available from E.I. du Pont de Nemours and Company under the trade name Teflon AF®. Applicants believe, however, that a host of other polymeric and non-polymeric materials may be useful as the separation media in the present arrangement. For example, a silicone-rubber layer coated upon a porous substrate may be utilized to render a substantially non-porous separation barrier. The silicone rubber layer may be applied to the substrate through a variety of mechanisms, such as plasma coating processes.

While the separation media referred to herein is preferably gas-permeable, liquid-impermeable, it is to be understood that separation media that are not completely gas-permeable, and/or that are not completely liquid-impermeable may be equally useful in the arrangements of the present invention. Accordingly, it is to be understood that the terminology "gas-permeable, liquid-impermeable" utilized herein includes materials that are not completely gas-permeable, and/or not completely liquid-impermeable. Moreover, it is to be understood that the terminology "gas and liquid-impermeable" utilized herein includes materials that are not completely gas-impermeable, and/or not completely liquid-impermeable.

In addition to the above, it is contemplated by the present invention that the gas-permeable, liquid-impermeable barriers utilized in the arrangements of the present invention may be in formations other than tubular. For example, the gas-permeable, liquid-impermeable barrier need only define separate chambers for enabling the transfer of one or more target gases from one chamber to another, and/or vice versa. Accordingly, the separation barriers referred to herein as "inner tubes" may take on a variety of configurations, including tubular and non-tubular.

In some embodiments, the gas-permeable, liquid-impermeable membranes may be extruded or otherwise formed as monolithic, free-standing tubes that do not require support structures along their length to remain viable in a wide range of operating conditions, including those involved in vacuum degassing. In some embodiments of the present invention, each of the gas-permeable, liquid-impermeable membranes of the present invention have a wall thickness of between about 0.003 and about 0.015 inches, with smaller or larger thicknesses being envisioned by the Applicants as useful in certain applications. In embodiments arranging the gas-permeable, liquid-impermeable membranes as tubes, the inside diameter of such inner tubes is preferably between about 0.01 and about 0.5 inches in dimension. Applicants, however, contemplate the use of smaller or larger inside diameter tubing, as required.

A variety of configurations for inlet and outlet connection devices 41, 43 are contemplated by the present invention. In the embodiment illustrated in FIG. 1, inlet and outlet connection devices 41, 43 include dual-shrink tubing 71, 73 disposed in surrounding relationship to respective inlet and outlet portions 32, 34 of inner tube 14. Such tubing sections 71, 73 are preferably heat shrunk about respective portions of inner tube 14, while inlet and outlet ends 22, 24 of outer tube 12 are preferably sealingly engaged with an outer surface of respective tubing sections 71, 73 so as to obtain a sealed engagement between outer tube 12, respective tubing sections 71, 73, and inner tube 14. Inlet and outlet connection devices 41, 43 further include nuts 45, 47 in conjunction with a pair of ferrules 49, 50 and which, in combination, are formed in surrounding relationship to tubing sections 71, 73 for connecting apparatus 10 between respective chromatographic system components.

Figure 4:
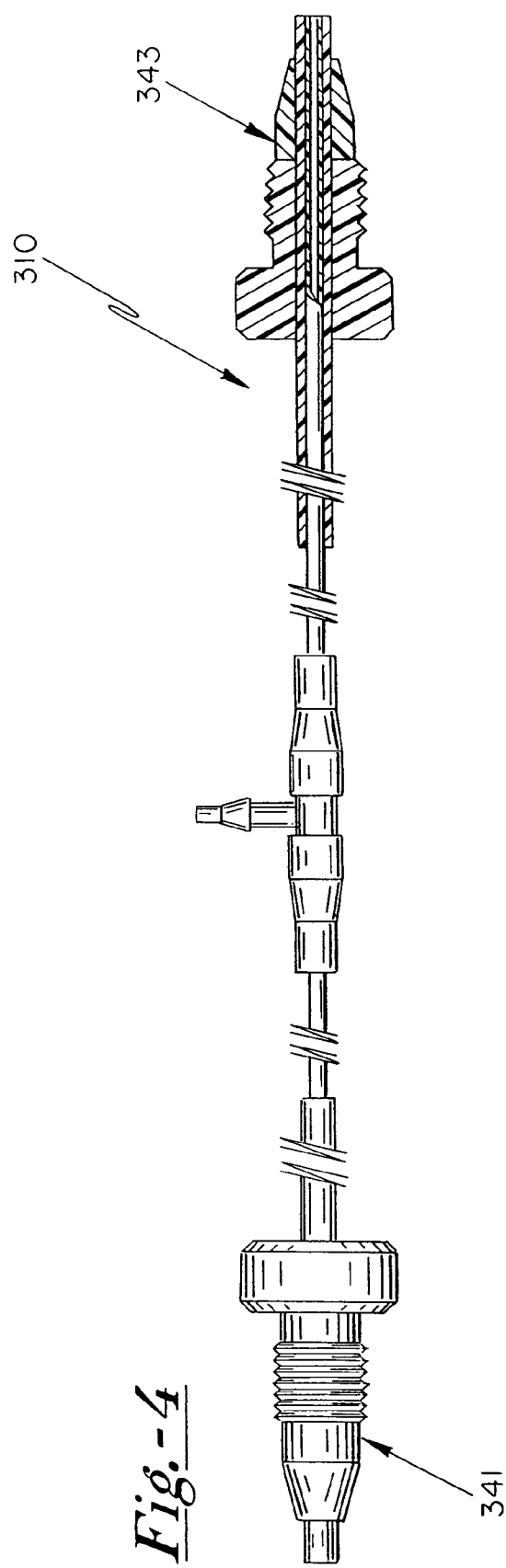
FIG. 4 is a partial cut-away view of a degassing apparatus of the present invention incorporating a particular configuration for the inlet and outlet connection means.

FIGS. 2-4 illustrate alternative configurations for the inlet and outlet connection means of the present invention. Specifically, apparatus 110 in FIG. 2 illustrates a female-type fitting comprising inlet and outlet connection means 141, 143. As shown in the enlarged view of outlet connection means 143 in FIG. 2, nut 147 operably engages a seat 150, which seat 150 acts as an intermediary object to transmit force against double sided ferrule 152. Progressive threaded engagement of nut 147 within receptacle 154 results in compressive contact between nut 147 and seat 150, which, in turn, results in compressive contact between seat 150 and first end 158 of double ended ferrule 152. Such compressive contact forces ferrule 152 against a tapered base of receptacle 154, so as to form a liquid and a gas-tight seal surrounding inner tube 114 at both sides of double ended ferrule 152. Receptacle 154 further includes a threaded opening 156 that is specifically configured for threadably receiving a fluid transfer line connector component (not shown) therein.

Apparatus 210 and apparatus 310 illustrated in FIGS. 3 and 4 depict male fittings of various configurations for respective inlet and outlet connection means 241, 243 and 341, 343. Such configurations illustrated in FIGS. 2-4 are exemplary only, and do not in any way restrict the scope of the present invention in its utilization of connection means having various known configurations. Preferably, however, the respective connection means utilized in a particular degassing apparatus of the present invention operably correspond and engage with respective components of an associated chromatographic system.

Another embodiment of the present invention is illustrated in FIGS. 5-6, wherein an apparatus 410 incorporates a plurality of gas-permeable, liquid-impermeable inner tubes 414 extending through outer tube 412. In such a manner, a relatively higher surface area of gas-permeable, liquid-impermeable tubing is exposed to the low pressure environment within the interior space defined by outer tube 412. As may be seen more clearly in FIG. 6, connection means 443 incorporates first nut 447 having a first barbed end 449 and a second threaded end 451 extending divergently with respect to first end 449. First nut 447 includes a central bore 453 through which semi-permeable tubes 414 extend.

In preferred embodiments, outlet end 424 of outer tube 412 is preferably operably press fit about first barbed end 449 of nut 447 so as to obtain a gas-tight seal therebetween. Barbed end 449 of nut 447 assists in retaining outer tube 412 in a fixed engagement therewith, in that annular barb 450 inhibits movement of outer tube 412 with respect thereto. Second threaded end 451 of first nut 447 is preferably threadably engageable with second nut 463. In particular, threaded end 451 of nut 447 is threadably engageable with threaded opening 465 of second nut 463. As shown in FIG. 6, threaded engagement of first nut 447 into nut 463 results in compressive contact between end 452 of nut 447 and ferrule 470. Such compressive contact operably forces ferrule 470 against first inner boss 482 of second nut 463 so as to obtain a fluid-tight seal therebetween. As such, fluid exiting respective inner tubes 414 flows through second open end 485 of second nut 463, and does not leak into and out from threaded opening 465 thereof. Preferably, a fluid transfer line connector (not shown) may be operably coupled to second open end 485 of second nut 463 so as to maintain fluid containment throughout the associated chromatographic system. Preferably, first and second nuts 447, 463 and ferrule 470 are fabricated from relatively durable and inert materials such as stainless steel and the like. Ferrule 470 is also preferably fabricated so as to moderately deform under contact pressure generated through the progressive threaded engagement of nut 447 into nut 463. Such deformation of ferrule 470 accommodates the fluid-tight engagement to first bossed portion 482 of second nut 463.

A further aspect of the present invention is illustrated in FIGS. 7 and 8, wherein a sealing apparatus 710 may be utilized to operably crimp outer tube 712 against inner tube 714 so as to create a gas and/or liquid tight seal therebetween. Apparatus 710 preferably includes a ferrule 718 that may be operably installed about outer tube 712 by sliding ferrule 718 over the outer diameter of outer tube 712 to a desired sealing position. In the embodiment illustrated in FIG. 7, first and second clamping rings 722, 724 are brought into engagement with respective first and second sides 719, 720 of ferrule 718. Since each of first and second clamping rings are tapered with a minimum inside diameter less than the outside diameter of first and second sides 719, 720 of ferrule 718, the operation of engaging first and second clamping rings 722, 724 onto ferrule 718 causes at least first and second sides 719, 720 of ferrule 718 to compress inwardly against outer tube 712. Such compression acts to displace a portion of outer tube 712 against inner tube 714, and with a force sufficient to create a gas and/or liquid tight seal therebetween.

To effectuate the displacement of ferrule 718, first and second clamping rings 722, 724 are preferably a relatively strong and rigid material such as stainless steel.

Apparatus 810 illustrated in FIG. 8 is similar to that described with reference to apparatus 710, except that ferrule 818 includes only a first side 819 such that only a first clamping ring 822 need be employed. Apparatus 810, therefore, obtains only a single sealing point between outer tube 812 and inner tube 814, while apparatus 710 operably obtains two sealing points between outer tube 712 and inner tube 714. It is contemplated by the Applicants that apparatus 710 may preferably be employed in applications having a need for a relatively high level of assurance that sealing between outer tube 712 and inner tube 714 has been accomplished.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. An elongated flow-through fluid treatment apparatus for treating one or more fluids passing therethrough, said fluid treatment apparatus comprising:
   (a) an elongated flexible outer member defining a first chamber therewithin, and being relatively gas and liquid impermeable;
   (b) one or more flexible inner barriers extending within said outer member and at least partially along said first chamber, said one or more inner barriers each being gas-permeable and liquid-impermeable, and having an inlet portion and an outlet portion;
   (c) one or more adapters extending from a side wall of said outer member and coextensively with one or more apertures therein such that a hollow channel extending through said one or more adapters provides for fluid connection between said first chamber and locations external to said one or more adapters;
   (d) sealing means for mechanically creating gas-tight junctions of said outer member adjacent said inlet and outlet portions of said one or more inner barriers;
   (e) inlet connection means operably coupled to said outer member and said inlet portion of said one or more inner barriers; and
   (f) outlet connection means operably coupled to said outer member and said outlet portion of said one or more inner barriers,
   said fluid treatment apparatus being sufficiently flexible so as to be readily manipulatable into desired configurations.

2. A fluid treatment apparatus as in claim 1 wherein said inner barriers are tubular.

3. A fluid treatment apparatus as in claim 1 wherein said outer member is selected from the group consisting of ethylene tetrafluoroethylene, FEP, and PEEK.

4. A method for treating a fluid, comprising:
   (a) providing a transfer line apparatus that is sufficiently flexible so as to be readily manipulatable into desired configurations, said transfer line apparatus having a flexible outer member defining a first chamber having a length, an inlet, and an outlet, said outer member being substantially gas and liquid impermeable, and a flexible inner barrier extending within said outer member and at least partially along said first chamber, said inner barrier being substantially gas-permeable and liquid-impermeable, and defining a second chamber by being interposed between said second chamber and said first chamber, said second chamber having an open end and a substantially opposed closed end;
   (b) operably coupling said open end of said second chamber into communication with a vacuum source so as to evacuate such second chamber; and
   (c) transporting said fluid through said first chamber from said inlet through said outlet.

5. A method as in claim 4 wherein said inlet is disposed at a first end of said outer member, and said outlet is disposed at a second substantially opposed end of said outer member.

6. A method as in claim 4 wherein said inner barrier comprises one or more tubes.

7. A method as in claim 6 wherein said one or more tubes extend substantially along a length of said first chamber.

8. A method of treating a fluid, comprising:
   (a) providing a transfer line apparatus that is sufficiently flexible so as to be readily manipulatable into desired configurations, said transfer line apparatus having a flexible outer member defining a first chamber having a length, an inlet, and an outlet, said outer member being substantially gas and liquid impermeable, and a flexible inner barrier extending within said outer member and at least partially along said first chamber, said inner barrier being substantially gas-permeable and liquid-impermeable, and defining a second chamber by being interposed between said second chamber and said first chamber;
   (b) operably coupling an open end of said second chamber to a first fluid source, such that said first fluid is transported through said second chamber; and
   (c) transporting a second fluid through said first chamber from said inlet through said outlet, said second fluid having a different target gas concentration than said first fluid, such that target gas is caused to operably pass through said inner barrier from one of said first and second fluids to the other of said first and second fluids having a relatively lower target gas concentration.

9. A method as in claim 8 wherein said inner barrier comprises one or more tubes.

10. A method for treating a fluid, comprising:
    (a) providing a transfer line apparatus that is sufficiently flexible so as to be readily manipulatable into desired configurations, said transfer line apparatus having a flexible outer member defining a first chamber having a length, an inlet, and an outlet, said outer member being substantially gas and liquid impermeable, and a flexible inner barrier extending within said outer member and at least partially along said first chamber, said inner barrier being substantially gas-permeable and liquid-impermeable, and defining a second chamber by being interposed between said second chamber and said first chamber;
    (b) operably coupling an open end of said second chamber to a first fluid source, such that said first fluid is transported through said second chamber; and
    (c) transporting a second fluid through said first chamber from said inlet through said outlet, said second fluid having a higher target gas concentration than said first fluid, such that target gas is caused to operably pass through said inner barrier from said second fluid to said first fluid.

11. A method as in claim 10 wherein said inner barrier comprises one or more inner tubes.

12. A method for treating a fluid, comprising:
    (a) providing a transfer line apparatus having an outer member defining a first chamber having a length, an inlet, and an outlet, said outer member being substantially gas and liquid impermeable, and an inner barrier extending within said outer member and at least partially along said first chamber, said inner barrier being sub stantially gas-permeable and liquid-impermeable, and separating components of said fluid primarily through a sorption-diffusion mechanism, said inner barrier defining a second chamber by being interposed between said second chamber and said first chamber, said second chamber having an open end and a substantially opposed closed end;

(b) operably coupling said open end of said second chamber into communication with a vacuum source so as to evacuate said second chamber; and (c) transporting said fluid through said first chamber from said inlet through said outlet.

* * * * *